US012564204B2

(12) United States Patent
Ray et al.

(10) Patent No.: US 12,564,204 B2
(45) Date of Patent: Mar. 3, 2026

(54) SYSTEM AND METHOD FOR STEAM FLAKING OF GRAINS

(71) Applicants: Michael L. Ray, Guymon, OK (US); Jonathon L. Beckett, Oceanside, CA (US)

(72) Inventors: Michael L. Ray, Guymon, OK (US); Jonathon L. Beckett, Oceanside, CA (US)

( * ) Notice: Subject to any disclaimer, the term of this patent is extended or adjusted under 35 U.S.C. 154(b) by 281 days.

(21) Appl. No.: 17/207,590

(22) Filed: Mar. 19, 2021

(65) Prior Publication Data

US 2021/0289819 A1     Sep. 23, 2021

Related U.S. Application Data

(60) Provisional application No. 62/991,988, filed on Mar. 19, 2020.

(51) Int. Cl.
| | |
|---|---|
| *A23L 7/139* | (2016.01) |
| *A23K 10/30* | (2016.01) |
| *A23K 40/20* | (2016.01) |

(52) U.S. Cl.
CPC .............. *A23K 40/20* (2016.05); *A23K 10/30* (2016.05); *A23L 7/139* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 4,734,294 | A | 3/1988 | Spiel et al. |
| 5,437,179 | A | 8/1995 | Wiegand et al. |
| 6,156,365 | A | 12/2000 | Liwszyc |
| 6,326,043 | B1 * | 12/2001 | Meilahn ................. G01N 33/10 |
| | | | 435/14 |
| 6,573,994 | B2 * | 6/2003 | Bachman ............... G01N 33/10 |
| | | | 356/402 |
| 6,648,930 | B2 | 11/2003 | Ulrich et al. |
| 6,718,910 | B1 | 4/2004 | Koyama et al. |
| 8,691,843 | B2 | 4/2014 | Vazquez-Anon et al. |
| 9,585,412 | B2 | 3/2017 | Corrigan |

(Continued)

FOREIGN PATENT DOCUMENTS

WO     PCT/US21/023360     6/2021

OTHER PUBLICATIONS

Schwandt. A survey of starch availability of steam-flaked corn in commercial feedlots evaluating roll size and flake density. Oct. 2016. Science Direct. https://www.sciencedirect.com/science/article/abs/pii/S1080744616300560.*

(Continued)

*Primary Examiner* — Erik Kashnikow
*Assistant Examiner* — Ashley Axtell
(74) *Attorney, Agent, or Firm* — GableGotwals; David G. Woodral

(57)     ABSTRACT

A system and method for processing a cereal grain including establishing a correlation between outgassing levels of one or more volatile compounds from the cereal grain as it is processed by exposure to steam cooking and rolling into a processed grain, and a starch availability in the processed grain, and altering the process to produce a desired starch availability by altering the flaking process to product the correlated outgassing levels of the volatile compounds.

7 Claims, 4 Drawing Sheets

(56) References Cited

U.S. PATENT DOCUMENTS

| | | |
|---|---|---|
| 2004/0161512 A1 | 8/2004 | Akashe et al. |
| 2005/0040026 A1 | 2/2005 | Grub et al. |
| 2009/0087523 A1 | 4/2009 | Freeman et al. |
| 2009/0087531 A1 | 4/2009 | Anders et al. |
| 2011/0154883 A1 | 6/2011 | Squicciarini et al. |
| 2013/0236620 A1 | 9/2013 | Herrera-Gomez et al. |
| 2013/0295233 A1 | 11/2013 | Karwowski et al. |
| 2017/0284995 A1 | 10/2017 | Owens et al. |

OTHER PUBLICATIONS

DePeters et al. In vitro gas production as a method to compare fermentation characteristics of steam-flaked corn. Mar. 2003. Retreived from URL: https://www.sciencedirect.com/science/article/pii/S0377840103000427.*

Armbruster, "Steam Flaking Grains for Feedlot Cattle: A Consultants Perspective", , pp. 46-55, Publisher: Proc Plains Nutrition Council.

Hales, KE, et al., "Effects of varying bulk densities of steam-flaked corn and dietary roughage concentration on in vitro fermentation, performance, carcass quality, and acid-base balance measurements in finishing steers", 2010, pp. 1135-1147, vol. 88, Publisher: J. Anim. Sci.

Owens, FN, et al., "Acidosis in Cattle: A Review.", 1998, pp. 275-286, vol. 76, Publisher: J Anim Sci.

Pfannhauser, W., "Volatiles Formed during extrusion Cooking of Cereals", 1993, pp. 109-113, vol. 8, Publisher: Flavor and Fragrance Journal.

Reinhardt, C. D., et al., "Effect of steam-flaked sorghum grain density on performance, mill production rate, and subacute acidosis in feedlot steers", 1997, pp. 2852-2857, vol. 75, Publisher: J. Anim. Sci.

Zinn, RA, et al., "Flaking corn: Processing mechanics, quality standards, and impacts on energy availability and performance of feedlot cattle", 2002, pp. 145-1156, No. 80, Publisher: J Anim Sci.

Pfannhauser, "Volatiles Formed During Extrusion Cooking of Cereals", 1993, pp. 109-113, vol. 8, Publisher: Flavour and Fragrance Journal.

* cited by examiner

SYSTEM AND METHOD FOR STEAM FLAKING OF GRAINS

CROSS-REFERENCE TO RELATED CASES

This application claims the benefit of U.S. provisional patent application Ser. No. 62/991,988, filed on Mar. 19, 2020, and incorporates such provisional application by reference into this disclosure as if fully set out at this point.

FIELD OF THE INVENTION

This disclosure relates to food processing in general and, more specifically, to steam flaking of grains suitable for animal feed and foodstuffs.

BACKGROUND OF THE INVENTION

For over 40 years, flaking corn has been recognized to dramatically enhance the available energy when fed to cattle. When corn is flaked, moisture is added to the kernel, and heat is applied for a sustained amount of time (normally 40-60 minutes) in a steam chamber. The heat gelatinizes the starch causing disruption of the starch-protein matrix, making it more digestible for both the microorganisms in the rumen of the cattle, as well as the cattle themselves through digestion and absorption in the small intestine. After the corn is "cooked", it passes through two rolls that rotate to flatten the kernel into a flake. This process increases the surface area of the corn to enhance the access for microorganisms and enzymes to digest the starches.

Flaking dramatically improves the energetic efficiency of corn. This improvement is often cited as approximately 15-20% compared with dry rolled corn and may be even higher with sorghum. This increase in energetic efficiency is largely due to the improvement in digestion in the small intestine. However, over processing the grain can be detrimental, resulting in increased risk of acidosis, bloat and laminitis, and decreased dry matter intake resulting in decreased gains and reduced efficiency of production.

Previously, the extent of processing of cereal grains has been assayed after the fact using enzymatic assays that estimate the extent of starch breakdown to individual glucose units. While this provides useful information, it is not available in real time such that flaking operations can be adjusted immediately if the operation becomes sub-optimal.

What is needed is a system and method that allows for reliable and repeatable flaking of grain, and provides feedback to control systems for automated monitoring and control of quality.

SUMMARY OF THE INVENTION

The invention of the present disclosure, in one aspect thereof, comprises a method of optimizing flaking of a cereal grain including establishing a correlation between outgassing levels of one or more volatile compounds from the cereal grain as it is processed by exposure to steam cooking and rolling into a processed grain, and a starch availability in the processed grain, selecting a desired starch availability for the processed grain, and determining a desired outgassing level of the one or more volatile compounds based on the desired starch availability and the correlation. The method further includes processing the cereal grain into processed grain by exposure to steam cooking and rolling of the cereal grain, monitoring outgassing of the one or more volatile compounds from the processed grain while the cereal grain is being processed, and adjusting at least one of a time of the steam cooking of the cereal grain, a temperature of the steam cooking of the cereal grain, a pressure of the steam cooking of the cereal grain, a flow rate of the cereal grain into a set of rollers, and a pressure between the rollers on the cereal grain based on the monitored outgassing to drive the monitored outgassing to the desired monitored outgassing level.

The step of establishing a correlation may comprise performing a linear regression analysis between detected amounts of the one or more volatile compounds and starch availability. In some embodiments, monitoring outgassing of the one or more volatile compounds is performed by a gas chromatograph. An electric signal corresponding to the measured outgassing may be provided from the gas chromatograph on a control computer.

The method may further comprise utilizing the control computer to adjust at least one of a time of the steam cooking of the cereal grain, a temperature of the steam cooking of the cereal grain, a pressure of the steam cooking of the cereal grain, a flow rate of the cereal grain into a set of rollers, and a pressure between the rollers on the cereal grain based on the monitored outgassing to drive the monitored outgassing to the desired monitored outgassing level. Adjusting a flow rate of the cereal grain into the set of roller may comprise altering cereal grain flow with a peg feeder under operative control of the control computer. Adjusting a pressure between the rollers on the cereal grain may comprise adjusting a hydraulic pressure applied to the rollers under operative control of the control computer.

The invention of the present disclosure, in another aspect thereof, comprises a system for optimizing cereal grain flaking including a steam chest provided with steam and pressure from a boiler, a peg feeder controlling the movement of grain from the steam chest, a set of rolls applying variable pressure to the grain exiting the steam chest via the peg feeder, and a gas chromatograph detecting an amount of one or more volatile compounds from grain exiting the rolls. The system includes a control computer having operative control of temperature and pressure in the steam chest, movement of grain through the peg feeder, and pressure applied by the set of rolls. The control computer operates the steam and pressure in the steam chest, movement of grain through the peg feeder, and pressure applied by the set of rolls to adjust amounts of the one or more volatile compounds detected by the gas chromatograph such that they are within a range correlating to a desired percentage of starch available in the cereal grain exiting from the rolls.

In some embodiments, the amounts of the one or more volatile compounds detected by the gas chromatograph are correlated to the a percentage of starch available in the cereal grain exiting from the rolls by an equation utilized by the computer based on a linear regression of measurements of the one or more volatile compounds versus the starch available in the cereal grain exiting from the rolls. The linear regression equation may be in the form: $Y=C+a1 \times X1+a2 \times X2+a3 \times X3 \ldots +an \times Xn$, for X amount of volatile compound 'n', 'a' coefficients, and C intercept.

In some embodiments, the control computer operates the steam and pressure in the steam chest, movement of grain through the peg feeder, and pressure applied by the set of rolls to adjust amounts of the one or more volatile compounds detected by the gas chromatograph such that they are within a range correlating to a desired percentage of starch available in the cereal grain exiting from the rolls in real time as grain flaking is still occurring. The control computer may alter a cook time of grain in the steam chest by controlling the peg feeder, with an increasing cook time of the grain tending to increase starch availability in the grain and presence of the one or more volatile compounds. The control computer may alter the pressure applied to the rolls using a hydraulic actuator, with increasing pressure applied to the rolls tending to increase starch availability in the grain and presence of the one or more volatile compounds.

The desired percentage of starch available in the cereal grain exiting from the rolls may be predetermined and less than a maximum possible starch available in the cereal grain. The chromatograph may detect at least alkyl carbon chains, ketones, aldehydes, alcohols, and esters.

The invention of the present disclosure, in another aspect thereof, comprises a system for optimizing grain processing including a steam chest, a plurality of steam lines connecting a boiler to the steam chest, a grain flow valve operable to adjust a flow rate of grain through the steam chest, and a roll set that rolls grain leaving the steam chest. The system has a gas chromatograph configured to measure intensities of volatile gas compounds from the rolled grain and a control computer. The control computer controls one or more of the steam lines, the grain flow valve, and a pressure of the rollers based on feedback from the gas chromatograph to result in measured intensities of the volatile gas compounds that correlate to a predetermined starch availability percentage in the rolled grain.

In some embodiments the measured intensity of the volatile gas compounds correlating to the predetermined starch availability percentage in the rolled grain is derived from a linear regression calculation correlating the measured intensity of the volatile gas compounds to starch availability percentage in the rolled grain. The control computer may increase the measured intensities of volatile gas compounds from the rolled grain in real time by increasing controlling the steam lines to increase temperature and pressure in the steam chest. The control computer may increase the measured intensities of volatile gas compounds from the rolled grain in real time by increasing a cook time of the grain by slowing the flow rate of the grain. The control computer may increase the measured intensities of volatile gas compounds from the rolled grain in real time by increasing pressure of the rollers on the grain.

DETAILED DESCRIPTION OF THE PREFERRED EMBODIMENTS

In various aspects, this disclosure relates to methods and systems for real-time monitoring and control of the processes involved in proper flaking procedures of cereal grain that is fed to cattle. In various embodiments, there are five important factors that affect the extent of processing, and thereby the availability of glucose for direct absorption or immediate use by microorganisms—these are: (1) steam chest temperature, (2) time spent in the cooking chamber, (3)

corrugation of the flaking rolls, (4) gap separating the rolls, and roll tension. Additionally, uptake of moisture into the corn kernel helps determine thoroughness of cook. Insufficient attention to any one of the five factors may limit the overall availability of the starch to digestion and absorption.

Figure 1:
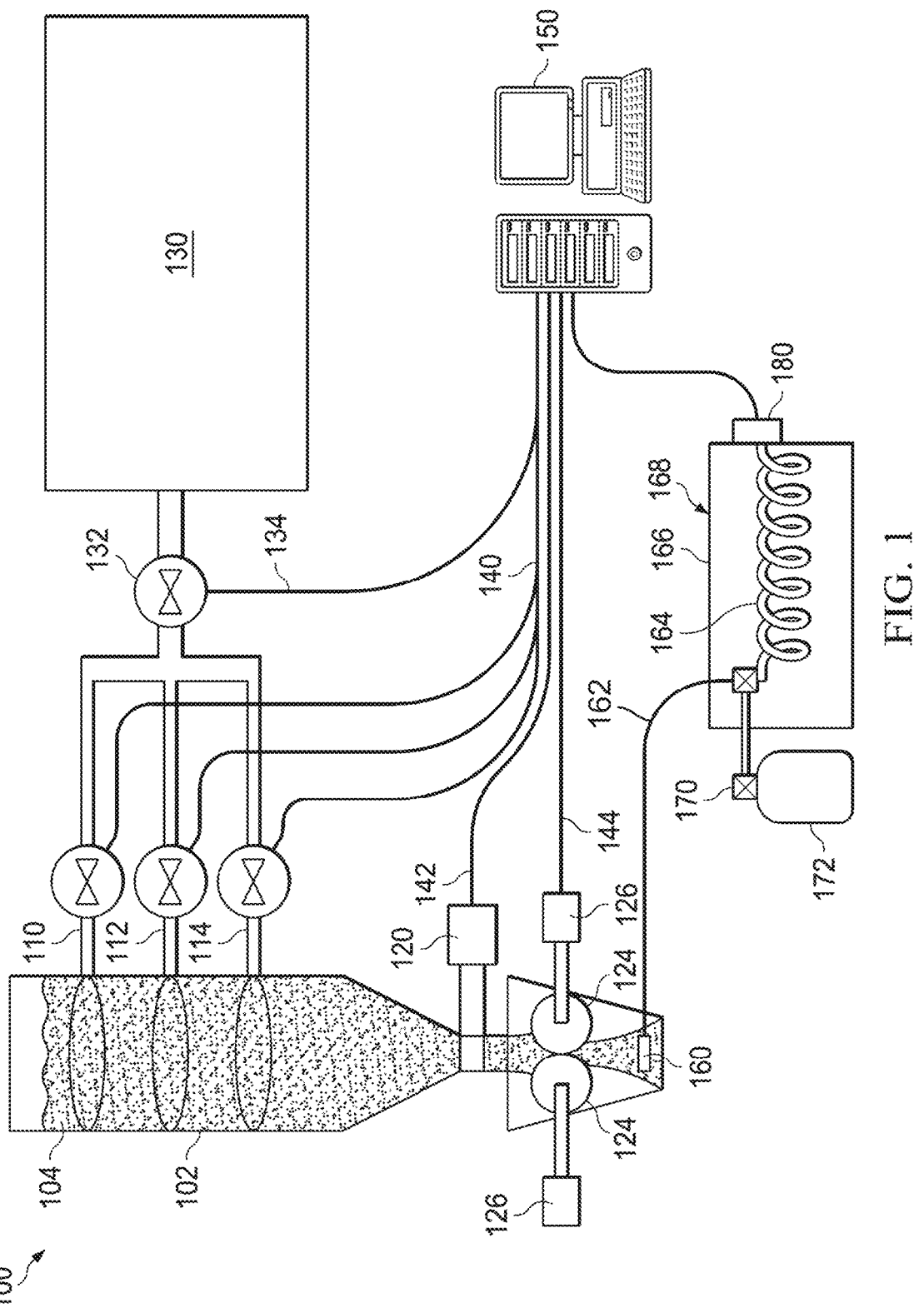
FIG. 1 is a schematic diagram of a flaking process and system according to aspects of the present disclosure.

Referring now to FIG. 1, a schematic diagram of a grain flaking system 100 based on aspects of the present disclosure is shown. The system 100 is illustrated as a corn flaking system but it should be understood it may be useful for, or could be adapted to, other food grains.

A steam chest 102 provides a location where grain or corn 104 is introduced to steam. Steam lines 110, 112, 114 provide introduction of steam to the grain 104 in the steam chest 102. Although three steam lines 110, 112, 114 are shown, a system may have more or fewer. The flow of grain 104 through the steam chest 102 may be controlled by a peg feeder 120 controlled by a variable speed motor. The peg feeder 120 provides one means of controlling the cook time, or dwell time, of the grain 104 within the steam chest 102.

Upon exiting the steam chest 102, the now-steamed grain is rolled through rollers 124. Pressure applied to the grain may be precisely controlled by roll pressure mechanism 126. This may be a hydraulic or electromechanical implementation allowing for adjustment of spacing and/or pressure between adjacent rollers.

Steam for the steam chest may be supplied by a boiler 130. The boiler may be electrically heated or heated by gas, oil, coal, or other means. The pressure and/or temperature of the boiler 130 may be controlled by boiler controller 132. Thermostats, fuel controls, pressure regulators, and other mechanisms for operating the boiler as are known in the art may be provided.

Part or all of the flaking process may be controlled by a control computer 150. The computer 150 may be a personal computer provided with necessary programming and data I/O to control the process. In another embodiment, the computer 150 may be purpose built and hard coded for necessary operations. Monitors, keyboard, touchscreens, and other necessary components as known in the art may be provided.

The computer 150 may be operable to control the steam lines 110, 112, 114 via control line 140. The boiler controller 132 may be operate via control line 134. Flow of grain may be controlled by control line 144. The roller operation may be controlled by control line 142. The various control lines 134, 140, 142, 144 may each comprise a collection of control lines as needed and are not intended to be limit to a particular wire or lead type. In some instances, the control lines may comprise wireless links.

The computer 150 may monitor the flaking process through a number of inputs. One particularly useful and important input is from a gas chromatography unit 168. The gas chromatography unit 168 may be implemented in number of ways. Here the gas chromatography unit 168 provides a sample probe 160 "downstream" of the rollers 124. A gas sample is retrieved via the probe 160 via sample line 162. This may be combined with a carrier gas 172 through a regulator 170. The combined mixture may enter an oven 166 through a column 164 that feeds into a detector 180. The computer 150 may obtain any or all information from the detector 180 than can be obtained via gas chromatography.

The flaking process may be controlled in numerous ways. Adjustment of the boiler pressure and temperature may provide one set of control parameters. Normally, a high-pressure, hot steam is utilized to cook the corn. The higher the pressure, the more thorough the cook and the higher the starch availability, all else being equal. A target starch availability may be established though. In other words, it may not be desirable to cook the grain as thoroughly as possible even though this may yield even greater starch availability. Over processed grain may produce detrimental or suboptimal results compared to under processed or high quality, ideally processed grain. Another consideration is the cost of fuel necessary to operate the boiler 130 versus the anticipated additional yield (in pounds of beef, for example).

The pressure and temperature of the steam are controlled by valves at the boiler (e.g., the boiler controller 132). These valves can be electronically controlled in response to the measured aromatic compounds released from the flaked corn as described further below. Control of steam flow into the steam chest 102 may be provided by opening or closing valves (e.g., of steam lines 110, 112, 114) controlling the steam flow into the steam chest 102. The steam enters the steam chest 102 through pipes that are attached to steam distribution rings in the steam chest 102, as are known in the art. There are normally 4-5 rings spaced across the height of the steam chest 102. Adjusting the steam in certain rings will influence the degree to which the corn is gelatinized. For example, applying more steam at the top will provide more time for the corn to cook and will improve or increase the starch availability. Each of the steam lines to the rings are controlled separately by valves that can be managed by computer output from the process gas chromatograph.

Control over the flaking process may also be affected by increasing or decreasing the flow of the corn to the rolls 124. For example, adjustment of flow valve 120 can increase or decrease the amount of time the corn spends in the steam chest 102. One of the primary factors influencing the starch availability is the time the corn stays in the steam chest 102. The time in the steam chest 102 is a major determinate on how thoroughly the corn is cooked and the protein-starch complex is disrupted. Reducing the flow rate of the corn from the bottom of the steam chest 102 to the rolls 124 increases the retention time of the corn in the steam chest and improves the cook (increases the starch availability).

Control over the flaking process can also be provided by increasing or decreasing the pressure on the rollers 124 to adjust flake density. Decreasing the flake density improves starch digestibility. This is achieved by applying more pressure to the rollers 124, thereby reducing the gap between the rollers 124 between which the corn passes and is flattened. The roll pressure mechanism 126 may comprise hydraulic rams that control this pressure and the control mechanism that determines the pressure on the hydraulic rams can be controlled electronically. As the corn is flattened to a greater extent, the gelatinized portion of the starch-protein complex will release more of the aromatic compounds associated with a quality flake that are relied upon by systems of the present disclosure to indicate the degree of processing or quality of the flake.

Extent of overall cook of a grain such as corn may be determined by temperature of the steam going into the steam chest 102 and retention time of the corn therein. Unfortunately, even though rolls 124 may be identical in dimension and age, each set of rolls needs to be managed individually as each set of rolls is unique in roll wear, gap, flow rate, and temperature and pressure regulation.

In current practice, the degree of processing of the flake may be evaluated by measuring the density of the flake by weighing a known volume of flake, and is often measured as pounds per bushel. However, this measurement most closely correlates to the physical act of flaking the corn, i.e., tension on the rolls and gap separating the rolls. While extent of cook may have some impact of flake density, it is possible to have a desirable flake density with an insufficient cook.

When grains are cooked, there are volatile compounds released. These compounds are released in direct proportion to the extent of cooking of the grain. These compounds can originate from the volatilizations of lipids and also by the pyrazines formed during the heating of carbohydrates and proteins. These volatile compounds will be concentrated in the chamber directly below the rolls prior to the flaked grain being carried away for production of the final feed (e.g., below the rolls 124 at or near the sample probe 160 as illustrated).

Gas chromatography has been long been used to detect airborne compounds. Using a process gas chromatograph (e.g., gas chromatograph 128), it is possible to accurately detect the amount of aromatic compounds released during the cooking and flaking process. This measure can be used to correlate to the starch availability of the flaked corn in real time. Further, the output from the gas chromatograph 168 may be transduced to an electronic signal or signals sent to the computer 150 that controls the flaking process.

In a specific example, the motor controlling the peg feeder 120 that determines cook time can be increased or decreased according to the detection of aromatic compounds. Steam valves and boiler pressure can each be controlled by the computer 150 and roll tension can be tightened or released due to the measured extent of cook. The gas chromatograph 168 may be positioned inline between the resulting flake and the computer controlling the cooking/flaking process for automatic and immediate feedback/control of the operation. Thus, in various embodiments, an objective method and system may be used to analyze the quality of processing flaked corn in a manner that is (1) rapid, (2) accurate, and (3) is conducive to immediate feedback to the flaking processes allowing for immediate modification of the processes influential to flake quality.

Steam-flaking grain has been widely adopted in the animal feeding industries as a method to increase the digestibility and bioavailability of the starch in the grain kernels. By heating the grain with steam (cooking), the protein-carbohydrate bonds that limit digestibility of the starch are disrupted rendering the carbohydrates to be readily broken down to mono- and disaccharide units which are easily digested by the animals, or in the case of ruminant animals, by the microorganisms in the rumen. By doing so, the overall tract digestibility of the starch can approach 100%, and growth performance of the animals is drastically improved. However, the quantification of the extent of starch availability is slow and relatively inaccurate. Currently, samples of the flaked grain are sent to a laboratory and the starches are enzymatically broken down to glucose. The amount of glucose measured in the resulting solution is reflective of the extent of processing and is referred to as "starch availability." The overall process often takes a week to determine the results rendering the information to be limited in usefulness for real-time feedback of the flaking process.

For many years, it has been known that cooking grain leads to the release of volatile compounds. Identifying the actual compounds can lead to the determination of the extent of processing by measuring the amplitude of the concentration of said compounds. Utilizing the gas chromatograph 168 to identify the amount of given compounds can lead to automatic control of the peg feeder 126 speed (flake production rate and cook retention time), steam pressure and temperature from boiler 130 (cook temperature) and roll 124 pressure (flake density).

An initial study correlating starch availability to retention time, cook temperature flake density clearly identified flake density as the most influential determinant of starch availability. Other studies by have focused on aromatic compounds released during the flaking process as a function of flake density.

In one example at a commercial feed yard in Southwest Kansas, samples were collected at varying flake densities that would span the range seen in commercial cattle feeding. The samples were collected right out of the rolls, placed in mason jars, and immediately frozen. The samples were then shipped overnight to Texas Tech University where the samples were thawed, and head space sampling of the compounds were analyzed with a gas chromatograph as the samples were warmed in a water bath. The results of the gas chromatograph were then analyzed for specific volatile compound identification and quantification.

The broad groups of volatile compounds analyzed include, but are not limited to: alkyl carbon chains, ketones, aldehydes, alcohols, and esters. More specific but non-limiting examples of volatiles observed, and which may be utilized by methods and system of the present disclosure include: acetyl aldehyde, acetone, pentane, butanol, isobu-tyraldehyde, 2, 3-butanedione, 2-butanone, 3-methylbuta-nal, 2-methylbutanol, 2, 3-pentadione, pentanal, butanoic acid methyl ester, 1-pentanol, 2-methyl thiopene, octane, hexanol, methyl-pyrazine, 1-haxanol, 2-heptanone, byturo-lactone, hexanoic acid methyl ester, alpha-pinene, 2-pentyl furan, trimethylpyrazine, heptanoic acid methyl ester, d-li-monene, benzoic acid, nonanoic acid, tetradecane, and dode-canal.

For the data obtained, starch availability verses volatiles was modeled a multiple linear model of the type:

$$Y=C+a_1 \times X_1+a_2 \times X_2+a_3 \times X_3 \ldots +a_n \times X_n$$

for X variables, 'a' coefficients, and C intercept.

Volatile compounds were selected to include in the model from those with the highest Pearson coefficients. The number of volatile compounds in the stepwise regression analysis required until full convergence of the model was determined as well. Below, are presented the fit values, R2 values, plots of actual vs predicted values, residual plots between actual and predicted, and distribution plots of the fits and real data versus the data for starch availability.

Figure 2:
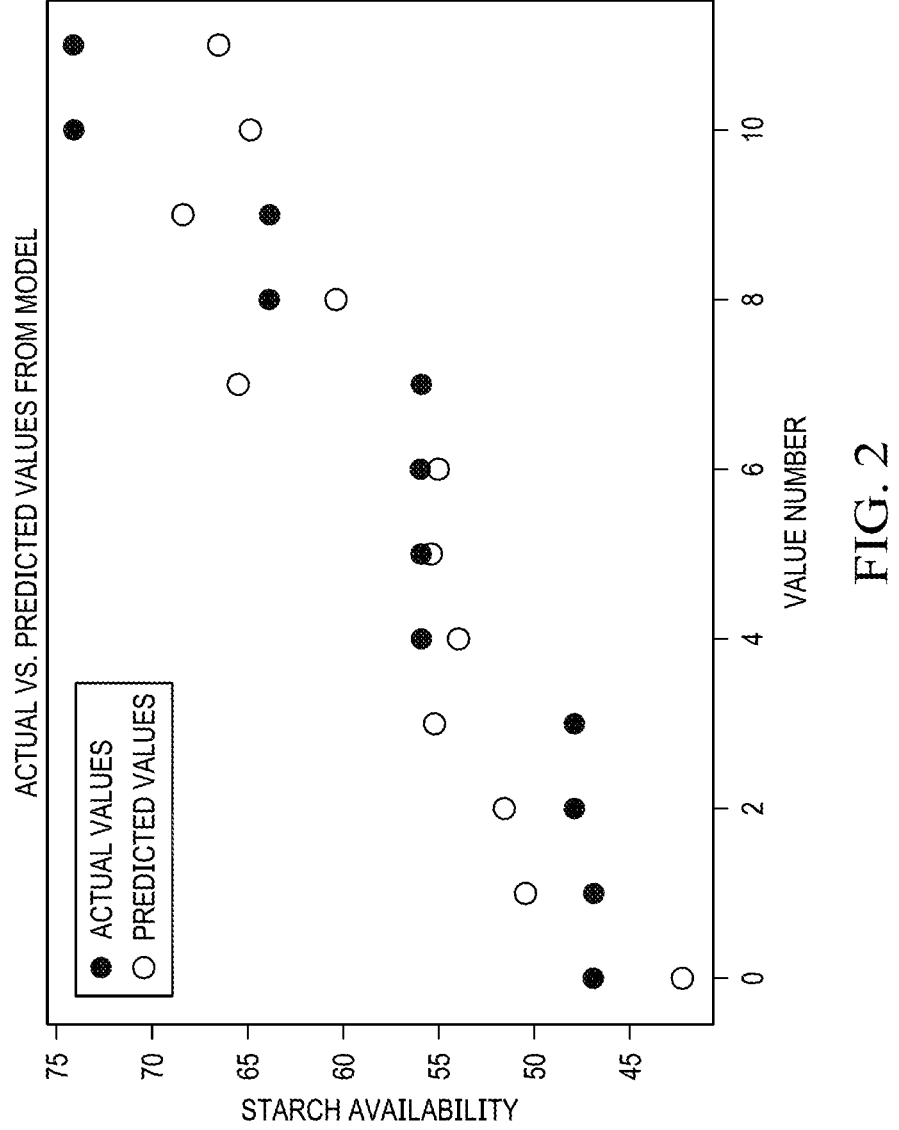
FIG. 2 is a chart of actual and predicted values of starch availability from a model utilizing pentane alone as a predictor.
Figure 3:
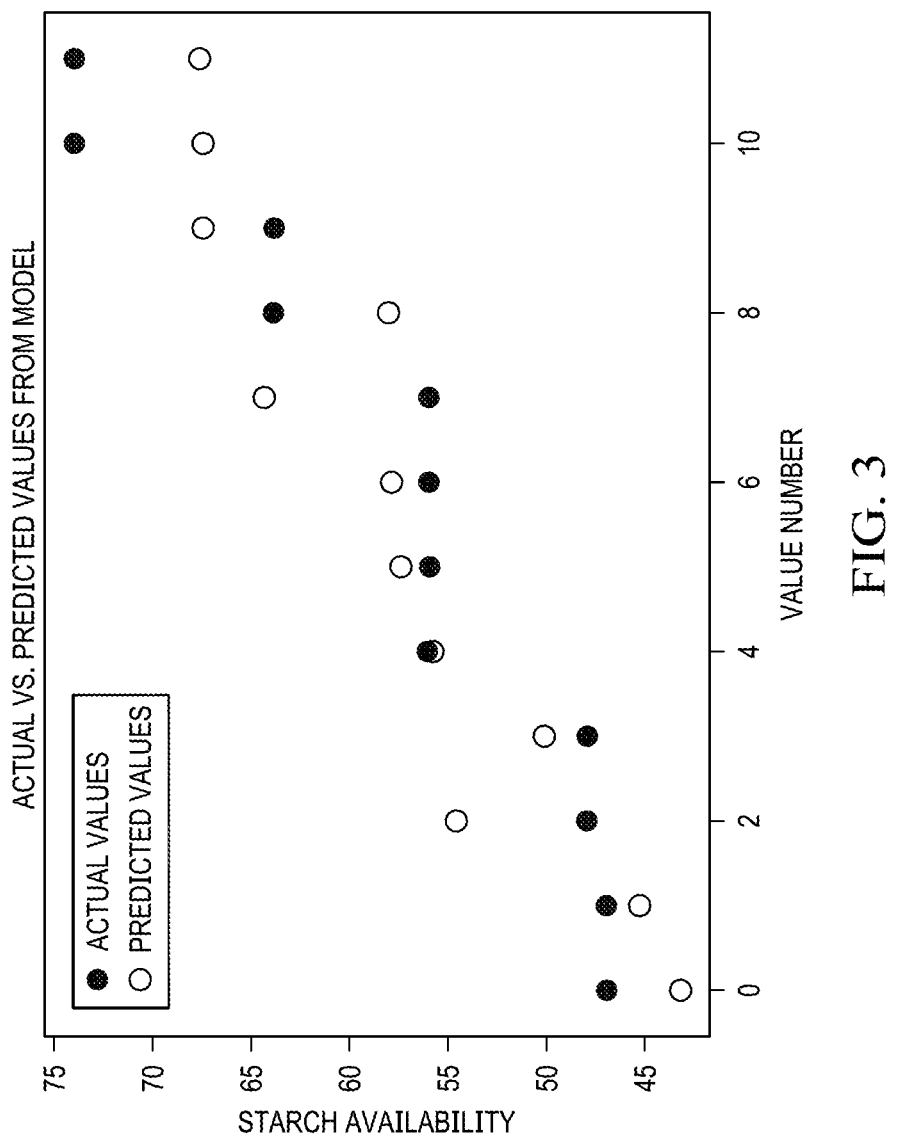
FIG. 3 is a chart of actual and predicted values of starch availability from a model utilizing pentane and 2-pentyl furan as predictors.

FIG. 2 is a chart of the actual and predicted values from the model for pentane alone. The Pearson square (R2) value of the response for this single volatile compound relative to starch availability was 64.5% (the X-axis reflects varying flake densities). However, by adding a second compound, 2-pentyl furan, the R2 was increased to 73.6%, as shown in FIG. 3.

As more volatiles were added to the linear regression equation, R2 values increased as expected, and asymptotically approached 100%.

Figure 4:
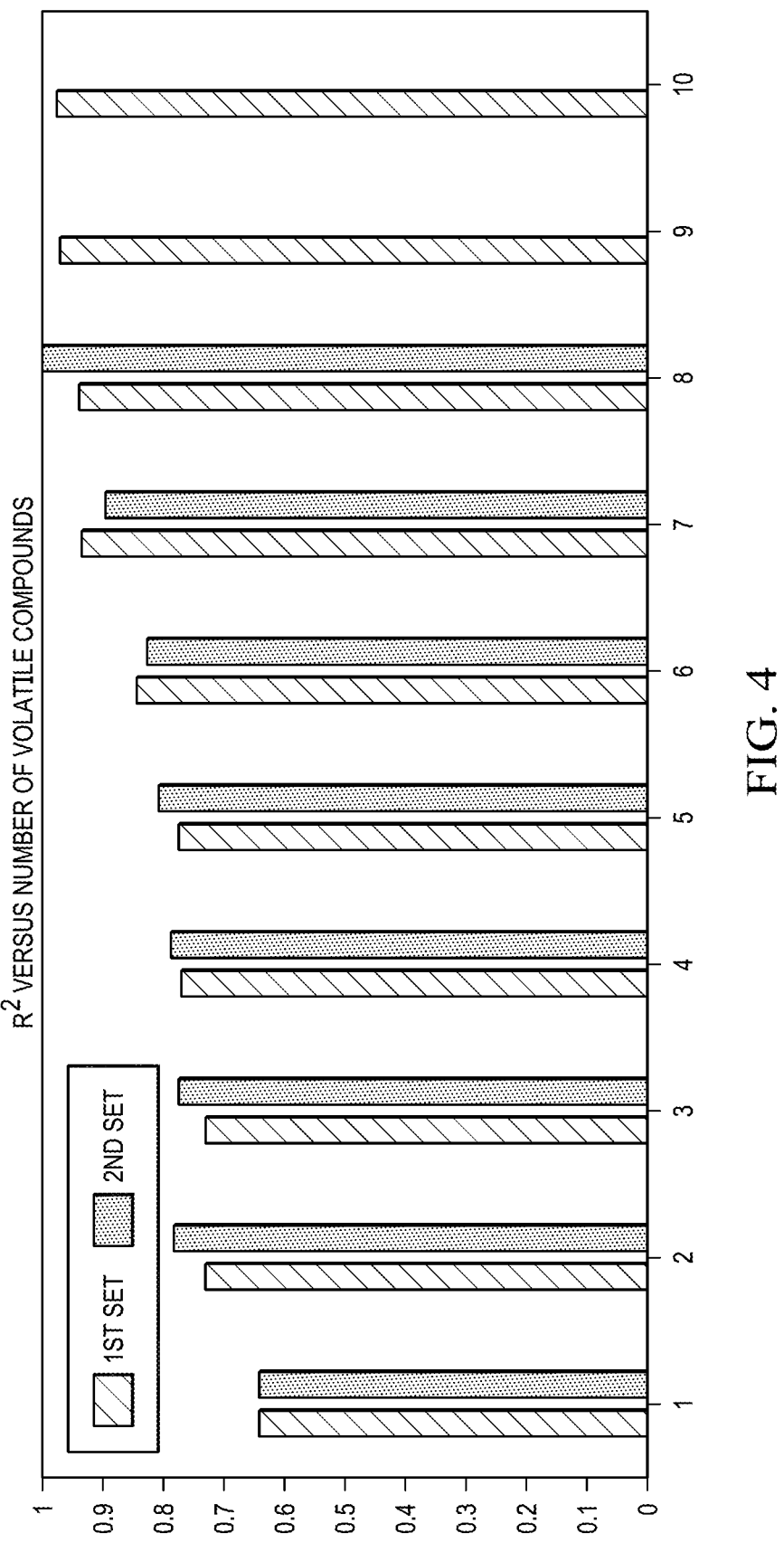
FIG. 4 is a chart illustrating $R^2$ values for multiple sets of samples based on models of the present disclosure.

A first set of 12 samples was followed by a second set of 9 samples to determine reproducibility. Again, the prediction of starch availability as a function of flake weight exceeds 90% within the measurement of 7 volatile compounds and in fact reached 100% with the 8th compound as can be seen in FIG. 4. Thus measuring volatile compounds clearly predicts extent of processing and starch availability of grains. When deployed according to the present disclosure, this technology is used to feedback to the different hardware systems, i.e., boiler pressure, flaking speed, hydraulic pressure on the rolls, etc., —involved in the flaking process and can ensure both a high-quality flake, and a consistent flake. Further, as more volatile compounds are identified, it may be possible to recognize "off" quality such as the presence of molds, mycotoxins or bacterial contamination.

As discussed above, increasing the pressure on the rolls 126 tends to increase starch availability in the flaking process as does increasing cook time (e.g., by slowing the peg feeder 120) or increasing temperature or steam pressure in the chest 102 from the boiler 130. Similarly, increasing the combinations of these effects or control may be used to increase starch availability in the flaking process as well. Likewise, decreasing roll pressure, cook time, temperature, and/or pressure can be used to lower processing and therefore starch availability resulting from the flaking process. A particular starch availability from the flaking process may be desired based on a number of factors identified herein and elsewhere. For example, 75% starch availably may be possible but not desirable in some instances based on desired cattle feeding operations, fuel costs, etc. Thus, the desired availability may be below maximum possible, but the flaking operation may still be desirable to increase utility of corn as a feed. Transportation costs versus local fuel costs can also drive the desired processing level of the corn or other grain.

Operational control of the flaking system 100 may be automatic based on the control signals from the computer 150. Control or adjustments may be made in real-time ensuring consistency of flake quality.

In a specific example of operation of the system 100 or a similar one according to the present disclosure, a prediction of starch availability with an R2 of 0.83 can be made using 6 compounds: 3-methylbutanal, octanal, 2,3-pentadendione, pentanal, hexanal, and 2Propanone. The regression equation for starch availability is:

$$SA=74.9072+1.79e-4*[\text{3-methylbutanol}]$$

$$+1.05e-7*[\text{Octanal}]$$

$$+6.09e-5*[\text{2,3-Pentanedione}]$$

$$+2.59e-4*[\text{Pentanal}]$$

$$+1.73e-4*[\text{Hexanal}]$$

$$-1.98e-4*[\text{2Propanone}]$$

As the 6 compounds are measured, the computer 150 adjust the controls, in this example, pressure on the rolls 124, in order to achieve the desired predicted starch availability. In the present example, a starch availability of 64% is selected as desired or optimum. To continue the example, if the chromatograph 168 and computer 150 determine that Hexanal and Octanal increase and 2 propanol decreases (with the other 3 remaining equal), the pressure on the rolls 124 will be decreased to increase the bushel weight and reducing the starch availability to achieve the target (i.e., 64%). This process is continuous and real-time and will maintain starch availability within parameters.

It should be noted that every set of rolls 124 may have different established regression equations as each combination of boiler, steam chest and rolls have specific characteristics that make them unique in their efficacy in cooking and rolling flakes. In further examples, the cook time of the corn as controlled by the peg feeder 120 may also be increased or decreased. Temperature and pressure of steam inside the chest 102 may also be adjusted to impact the measured volatiles and used as a predictor of starch availability per the determined starch availability equation. Delivery of steam into the chest 102 can also be further refined by relying more or less on particular steam rings fed by steam lines 110, 112, 114.

<div align="center">REFERENCES</div>

Armbruster. *Steam Flaking Grains for Feedlot Cattle: A Consultant's Perspective*. Proc Plains Nutrition Council. pp 46-55.

Hales, K E, J P McMeniman, J Leibovich, J T Vasconcelos, M. J Quinn, M L. May, N DiLorenzo, D R Smith and M L Galyean. 2010. *Effects of varying bulk densities of steam-flaked corn and dietary roughage concentration on in vitro fermentation, performance, carcass quality, and acid-base balance measurements in finishing steers. J. Anim. Sci.* Volume 88:1135-1147.

Owens, F N, D S Secrist, W J Hill, and D R Gill. 1998. *Acidosis in Cattle: A Review*. J Anim Sci 76:275-286.

Pfannhauser, W. 1993. *Volatiles Formed during extrusion Cooking of Cereals*. Flavor and Fragrance Journal, 8:109-113.

Reinhardt, C. D., R. T. Brandt, Jr., K. C. Behnke, A. S. Freeman, and T. P. Eck. 1997. *Effect of steam-flaked sorghum grain density on performance, mill production rate, and subacute acidosis in feedlot steers*. J. Anim. Sci. 75:2852-2857.

Schwand E F, M E Hubbert, D U Thompson, C I Vahl, S J Bartle and C J Reinhardt. 2016. *A Survey of Starch Availability of Steam-flaked corn in Commercial Feedlots Evaluating Roll Size and Flake Density*. Prof Anim Sci 32:550-560.

Zinn, R A, F N Owens and R A Ware. 2002. *Flaking corn: Processing mechanics, quality standards, and impacts on energy availability and performance of feedlot cattle*. J Anim Sci, 80:1145-1156.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of optimizing flaking of a cereal grain comprising:

establishing a correlation between outgassing levels of one or more volatile compounds from the cereal grain as the cereal grain is processed by exposure to steam cooking and rolling into a processed grain, and a starch availability in the processed grain;

selecting a desired starch availability for the processed grain;

determining a desired outgassing level of the one or more volatile compounds based on the desired starch availability and the correlation;

processing the cereal grain into processed grain by exposure to steam cooking and rolling of the cereal grain;

monitoring outgassing of the one or more volatile compounds from the cereal grain while the cereal grain is being processed by the exposure to steam cooking and rolling of the cereal grain;

adjusting at least one of a time of the steam cooking of the cereal grain, a temperature of the steam cooking of the cereal grain, a pressure of the steam cooking of the cereal grain, a flow rate of the cereal grain into a set of rollers, and a pressure between the set of rollers on the cereal grain based on the monitored outgassing to drive the monitored outgassing to a desired monitored outgassing level as the processing the cereal grain into processed grain by the exposure to the steam cooking and the rolling of the cereal grain occurs.

2. The method of claim 1, wherein the establishing of the correlation comprises performing a linear regression analysis between detected amounts of the one or more volatile compounds and starch availability.

3. The method of claim 1, wherein the monitoring of the outgassing of the one or more volatile compounds is performed by a gas chromatograph.

4. The method of claim 3, wherein an electric signal corresponding to the monitored outgassing is provided from the gas chromatograph on a control computer.

5. The method of claim 4, further comprising utilizing the control computer to perform the step of the adjusting of at least one of the time of the steam cooking of the cereal grain, the temperature of the steam cooking of the cereal grain, the pressure of the steam cooking of the cereal grain, the flow rate of the cereal grain into the set of rollers, and the pressure between the set of rollers on the cereal grain based on the monitored outgassing to drive the monitored outgassing to the desired monitored outgassing level as the processing the cereal grain into the processed grain by the exposure to the steam cooking and the rolling of the cereal grain occurs.

6. The method of claim 5, wherein the adjusting the flow rate of the cereal grain into the set of roller comprises altering cereal grain flow with a peg feeder under operative control of the control computer.

7. The method of claim 5, wherein the adjusting the pressure between the set of rollers on the cereal grain comprises adjusting a hydraulic pressure applied to the rollers under operative control of the control computer.

* * * * *